US012118788B2

(12) United States Patent
Golestaneh et al.

(10) Patent No.: US 12,118,788 B2
(45) Date of Patent: Oct. 15, 2024

(54) LEARNING SEMANTIC SEGMENTATION MODELS IN THE ABSENCE OF A PORTION OF CLASS LABELS

(71) Applicant: Robert Bosch GmbH, Stuttgart (DE)

(72) Inventors: S Alireza Golestaneh, Pittsburgh, PA (US); João D. Semedo, Pittsburgh, PA (US); Filipe J. Cabrita Condessa, Pittsburgh, PA (US); Wan-Yi Lin, Wexford, PA (US); Stefan Gehrer, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 17/592,378

(22) Filed: Feb. 3, 2022

(65) Prior Publication Data

US 2023/0245450 A1   Aug. 3, 2023

(51) Int. Cl.
*G06V 20/40*   (2022.01)
*G06V 10/764*   (2022.01)

(52) U.S. Cl.
CPC .......... *G06V 20/41* (2022.01); *G06V 10/764* (2022.01); *G06V 10/765* (2022.01)

(58) Field of Classification Search
CPC .... G06V 20/41; G06V 10/764; G06V 10/765; G06V 10/7753; G06V 10/82
See application file for complete search history.

(56) References Cited

U.S. PATENT DOCUMENTS

2018/0336683 A1* 11/2018 Feng ................... G06T 7/12
2019/0279074 A1*  9/2019 Lin .................. G06F 16/583
2021/0124985 A1*  4/2021 Ren ................... G06V 30/248
2021/0150281 A1*  5/2021 Tsai ..................... G06N 3/08
2021/0166150 A1*  6/2021 Wang .................. G06T 7/10
2022/0101127 A1*  3/2022 Torras ................ G06V 10/774
2022/0391632 A1* 12/2022 Ren ..................... G06F 18/21
2023/0105590 A1*  4/2023 Wei ................... G06V 10/774
                                                                  382/159
2023/0274527 A1*  8/2023 Chen .................. G06F 18/214
                                                                  382/181
2023/0360399 A1* 11/2023 Behrmann ........... G06V 20/41

OTHER PUBLICATIONS

Kato et al., Zero-Shot Semantic Segmentation Via Variational Mapping, Proceedings of the IEEE/CVF International Conference on Computer Vision Workshops, 2019.
Bucher et al., Zero-Shot Semantic Segmentation, Advances in Neural Information Processing System 32 (2019): 468-479.
Michieli et al., Knowledge Distillation for Incremental Learning in Semantic Segmentation, Computer Vision and Image Understanding 205 (2021): 103167.

* cited by examiner

*Primary Examiner* — John B Strege
(74) *Attorney, Agent, or Firm* — Brooks Kushman P.C.

(57) ABSTRACT

Performing semantic segmentation in an absence of labels for one or more semantic classes is provided. One or more weak predictors are utilized to obtain label proposals of novel classes for an original dataset for which at least a subset of sematic classes are unlabeled classes. The label proposals are merged with ground truth of the original dataset to generate a merged dataset, the ground truth defining labeled classes of portions of the original dataset. A machine learning model is trained using the merged dataset. The machine learning model is utilized for performing semantic segmentation on image data.

21 Claims, 5 Drawing Sheets

LEARNING SEMANTIC SEGMENTATION MODELS IN THE ABSENCE OF A PORTION OF CLASS LABELS

TECHNICAL FIELD

Aspects of present disclosure relate to segmentation of images in the absence of labels for one or more semantic classes using domain-knowledge distillation.

BACKGROUND

Sematic segmentation refers to a computer vision task in which regions of an image are labeled based on the items that are included in the image. The semantic segmentation task is to label each pixel of the image with a corresponding class of what is being represented by that pixel.

Deep learning approaches to computer vision require large amounts of labeled and carefully curated data to perform well. Semantic segmentation, where each pixel in an input image is classified as belonging to a semantic class is particularly demanding, as each pixel in each training example must be labeled to enable successful model training. As a result, while semantic segmentation is an important component in a variety of tasks, from scene analysis to self-driving cars, it is dependent on the availability of expensive labeled data.

SUMMARY

In one or more illustrative examples, a method for performing semantic segmentation in an absence of labels for one or more semantic classes is provided. One or more weak predictors are utilized to obtain label proposals of novel classes for an original dataset for which at least a subset of sematic classes are unlabeled classes. The label proposals are merged with ground truth of the original dataset to generate a merged dataset, the ground truth defining labeled classes of portions of the original dataset. A machine learning model is trained using the merged dataset. The machine learning model is utilized for performing semantic segmentation on image data.

In one or more illustrative examples, a system for performing semantic segmentation in an absence of labels for one or more semantic classes is provided. One or more processors programmed to utilize one or more weak predictors to obtain label proposals of novel classes for an original dataset for which at least a subset of sematic classes are unlabeled classes; merge the label proposals with ground truth of the original dataset to generate a merged dataset, the ground truth defining labeled classes of portions of the original dataset; train a machine learning model using the merged dataset; and utilize the machine learning model for performing semantic segmentation on image data.

In one or more illustrative examples, a non-transitory computer-readable medium comprising instructions for performing semantic segmentation in an absence of labels for one or more semantic classes, that, when executed by one or more processors case the one or more processors to perform operations including to utilize one or more weak predictors to obtain label proposals of novel classes for an original dataset for which at least a subset of sematic classes are unlabeled classes; merge the label proposals with ground truth of the original dataset to generate a merged dataset, the ground truth defining labeled classes of portions of the original dataset; train a machine learning model using the merged dataset; and utilize the machine learning model for performing semantic segmentation on image data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Semantic segmentation in the absence of labels may be roughly divided into two categories. The first one, fully-unsupervised semantic segmentation, aims to learn useful feature representations from images alone. This class of approaches do not necessarily yield semantically meaningful classes, instead focusing on improving performance of (possibly supervised) downstream tasks. The second category, weakly-supervised semantic segmentation, seeks to learn segmentation maps that are semantically meaningful but does so relying on little to no labeled data. Approaches in this camp still seek to learn similar classes to those used in supervised learning, in some examples directly encoding specific characteristics of the target classes.

Aspects of the disclosure relate to an improved approach for training highly accurate semantic segmentation models in the absence of labels for a subset of classes. These classes for which no label exists may be referred to herein as novel classes. The disclosed approach allows for the model to directly output segmentation with novel classes, as opposed to other approaches that post-process the network output.

Figure 1:
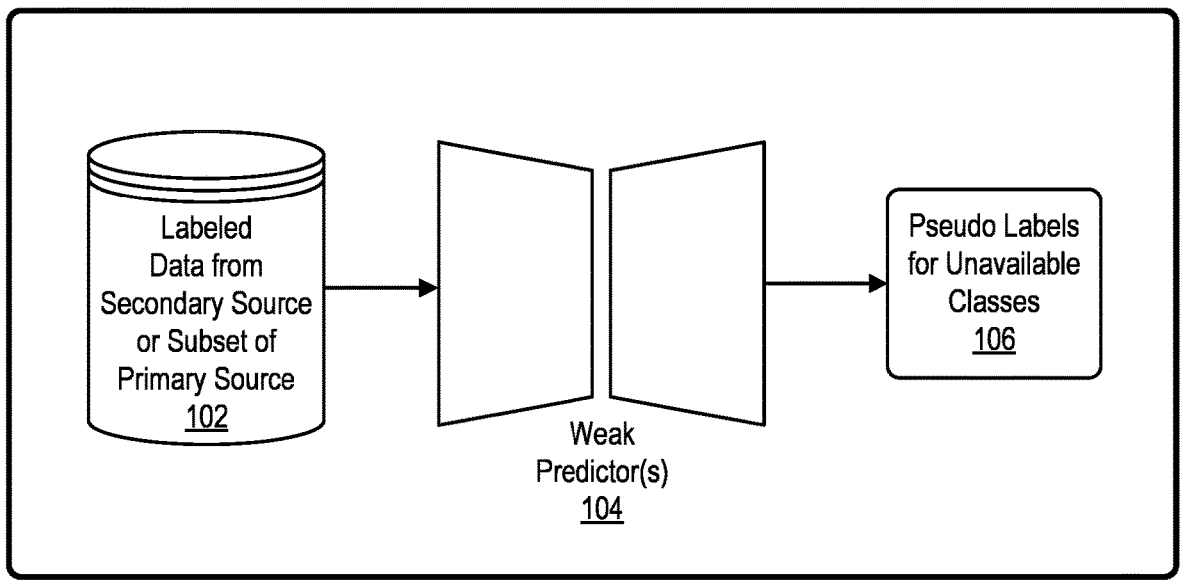
FIG. 1 illustrates an example data flow diagram for obtaining label proposals using a weak predictor approach.
Figure 2:
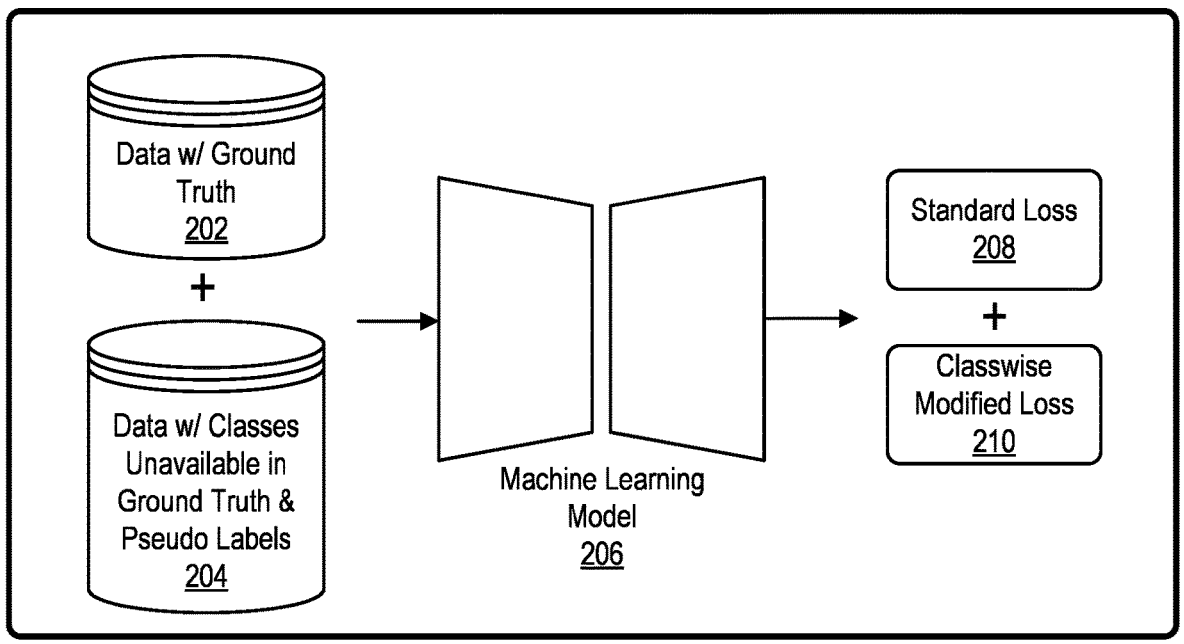
FIG. 2 illustrates an example data flow diagram for using a supervised learning approach where the label proposals are treated as ground truth information.

The model may be trained by leveraging architectural constraints of convolutional neural networks (CNNs) and label proposals from domain-specific weak predictors. The weak predictors may be trained on different dataset in the same domain (i.e., images), as opposed to the user of data from a different domain (e.g., textual data). As shown in FIG. 1, weak predictors 104 may be used to generate segmentation proposals for the novel classes. As shown in FIG. 2, a machine learning model 206 may be trained to simultaneously predict both the available labels and the proposals.

FIG. 1 illustrates an example data flow diagram of a system 100 for obtaining label proposals 106 using a weak predictor 104 approach. As shown, the approach may begin with an original dataset 102. In an example, the original dataset 102 may be labeled data from a secondary source. In another example, the original dataset 102 may be a subset of the data from the primary source to be labeled.

In the disclosed approach, a weakly-supervised learning approach is provided that is able to learn semantically meaningful segmentation maps in the complete absence of labels for a subset of classes. To do so, weak predictors 104, which encode domain-knowledge pertaining to these unlabeled classes, may be used to generate label proposals 106 for the missing labels. The weak predictors 104 may be segmentation models that propose pixel locations for the missing classes. They can be constructed in multiple ways, which largely fall into two approaches: feature-based predictors and transfer-based predictors.

Feature-based predictors may use hand-crafted features to generate proposals. In an example, a weak predictor 104 for the class "lane" in a lane-tracking application may be constructed by detecting edges within a region of interest in the image. Transfer-based predictors may be trained to predict the class or classes of interest on a separate (typically publicly available) dataset. These weak predictors 104 may then be used to generate predictions on the dataset of interest for which labels were previously unavailable. It should be noted that feature-based weak predictors 104 and transfer-based weak predictors 104 may perform worse than models directly trained on labeled data, and often will not perform sufficiently well to constitute a final solution by themselves.

It should further be noted that the weak predictors 104 are not limited to a neural network architecture (such as a teacher network) and may be any of various different algorithms. Moreover, the disclosed approach also allows for a combination of knowledge from multiple weak predictors 104 in the generation of the label proposals 106.

FIG. 2 illustrates an example data flow diagram 200 for using a supervised learning approach where the label proposals 106 are treated as ground truth information. As shown, data with ground truth 202, and also data with classes unavailable in the ground truth 204 (but including the label proposals 106), is provided to a machine learning model 206.

The objective in an image semantic segmentation problem is to partition an image (or video frame) into multiple segments or objects, usually with clear semantic meaning. In practice, many approaches achieve this by assigning each pixel in the input image, $x_{i,j}$ to one of k classes. Most approaches may be trained to perform well on this problem using supervised learning. Supervised learning relies on a set of labeled data, where for each image there exists an associated label map, assigning each pixel to one of the semantic classes. The machine learning model 206 (e.g., a convolutional neural network in many cases) may therefore be trained to match the labels in the dataset, akin to a classification task.

The disclosed approach utilizes the label proposals 106 from the weak predictors 104 as a training signal for the larger machine learning model 206 (e.g., a CNN in many examples). Thus, the machine learning model 206 may be jointly trained on both the existing labels in the data with ground truth 202 and also the label proposals 106 for missing labels in data with classes unavailable in the ground truth 204. This may be accomplished by fusing the available ground truth labels with the label proposals 106 from the weak predictors 104. Once the input data is merged, the training of the machine learning model 206 may proceed using, for example, a conventional supervised learning approach where the label proposals 106 are treated as additional ground truth information. By merging the label proposals 106 with the ground truth data, the training of the machine learning model 206 may leverage the inductive biases of the convolutional architecture to combine the ground truth information with the noisy label proposals 106.

In some examples, a standard loss function 208 may be used for training of the machine learning model 206. In other examples, performance may be further aided by included targeted loss components that aim to improve performance on critical classes. Depending on the specific application for the semantic segmentation model, it may be useful to achieve high performance goals for critical classes (e.g., pedestrian recall for a self-driving car). Furthermore, because the label proposals 106 generated by the weak predictors 104 may be noisy, fine-tuning might be desirable to ensure correct integration with the ground truth labels. With this in mind, separate loss components may be introduced that target individual classes of interest. Thus, as another example, a classwise modified loss function 210 may be used.

Figure 3:
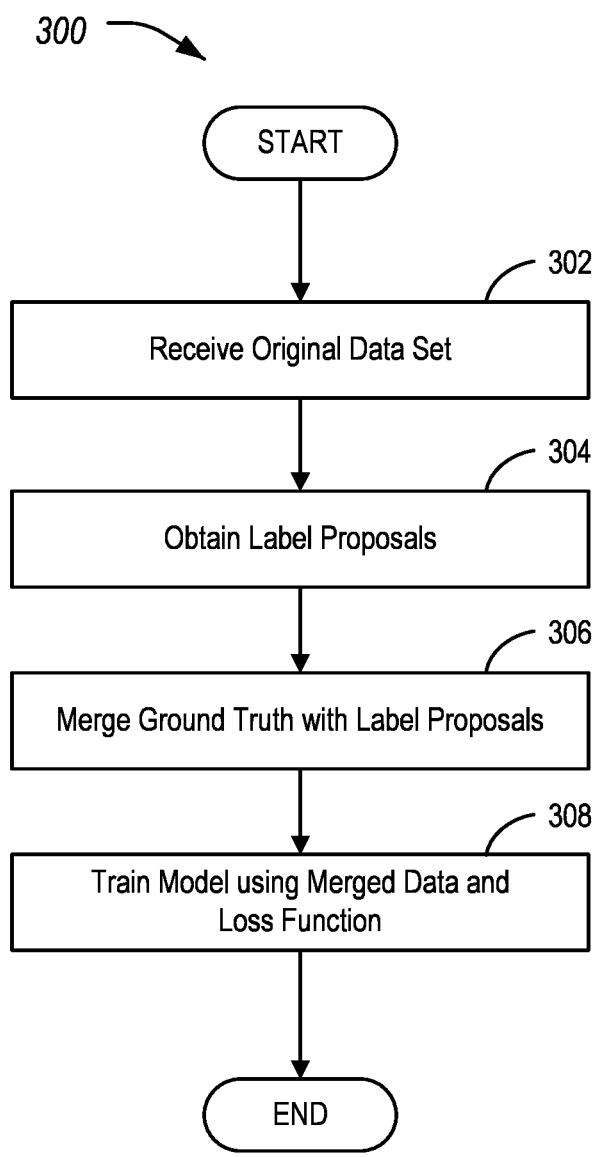
FIG. 3 illustrates an example process for performing semantic segmentation in the absence of labels for one or more semantic classes (i.e., novel classes) using domain-knowledge distillation.

FIG. 3 illustrates an example process 300 for performing semantic segmentation in the absence of labels for one or more semantic classes C using domain-knowledge distillation.

At operation 302, an original dataset 102 may be received. The original dataset 102 may have an absence of labels for a subset of classes. Let the original dataset 102 be referred to as D, and let C refer to the classes in D. One subset of the classes C in D may have labels available, while other classes C in D may not have labels available. Let the set of classes C in the original dataset D be defined as:

$$C = C_{novel} \cup C_{labeled},$$

where:

$C_{novel}$ is a subset of the classes C for which no labels are available, and $C_{labeled}$ is a subset of the classes C for which labels are available.

There may also be a subset of classes in $C_{labeled}$, $C_{admissible}$, such that $C_{novel}$ can occur instead for those classes.

At operation 304, for each class n in $C_{novel}$, the weak predictors 104 may be used to generate label proposals 106. The weak predictors 104 may operate to produce the label proposals 106 through various approaches, as noted above. In an example, the label proposals 106 may be obtained from a binary classification/segmentation model for the class with missing labels trained on a separate dataset. In another example, the label proposals 106 may be obtained from an unsupervised predictor (e.g., an edge detector, clustering, etc.).

At operation 306, the available ground truth labels are merged with the new label proposals 106. For example, for each pixel assigned to one of the admissible ground truth class labels, if the label proposals 106 from the weak predictors 104 assign the pixel to one of the missing classes in C, assign this pixel to the missing class. The other pixels may then be assigned to the class in C as specified in the ground truth.

At operation 308, the machine learning model 206 is trained using a loss function. The loss function may measure mismatch between the predictions of the machine learning model 206 and the associated ground truth labels for a given image. A common choice for L may be cross-entropy loss. In a simple example, a standard loss function 208 may be utilized, such as:

$$L(y,\hat{y}),$$

where:

y is the label (either from ground truth or generated using the weak predictors 104), where y has dimensions W×H (W is the width of the image, H is the height), $\hat{y}=f(x)$ is the model prediction (the output of the machine learning model 206) and has dimensions W×H×K, and K is the number of classes.

In another example, a modified loss function 210 may be used to include targeted loss components that aim to improve performance on critical classes. This loss function 210 may be modified by adding additional class-specific terms. One example of a modified loss function 210 may be:

$$L^{Crit}(y,\hat{y})=L(y,\hat{y})+L_{Dice}^{Class1}(y,\hat{y})+L_{Dice}^{Class2}(y,\hat{y})+\ldots,$$

where:

Class1, Class2, etc. are the novel classes $C_{novel}$; and $L_{Dice}^{Class(n)}(y,\hat{y})$ is the dice loss applied to the respective class Class(n).

After operation 308, the process 300 ends. Once operation 308 is complete, the machine learning model 206 may be used to perform semantic segmentation on image data. The semantic segmentation may allow for the assignment of pixels of the image data to the classes indicated in the ground truth as well as using the novel classes indicated in the label proposals 106.

The process 300 may be useful in contexts where it is known that there are novel classes in the original dataset 102 that are lacking in labels. The process 300 may accordingly be useful for various applications. As one possibility, the disclosed approach may be used to augment existing datasets, allowing for the semantic segmentation of classes for which labels are not available in the dataset. This will directly improve the scene-understanding capabilities of the computer vision stack involved. As another example, the disclosed approach may be used to economize manual labeling of data, allowing labeling efforts to focus on semantic classes which are harder to predict using domain-knowledge and weak predictors 104. It should also be noted that higher accuracy may be achieved by combining knowledge from the use of multiple weak predictors 104 to augment the original dataset 102 with label proposals 106.

Figure 4:
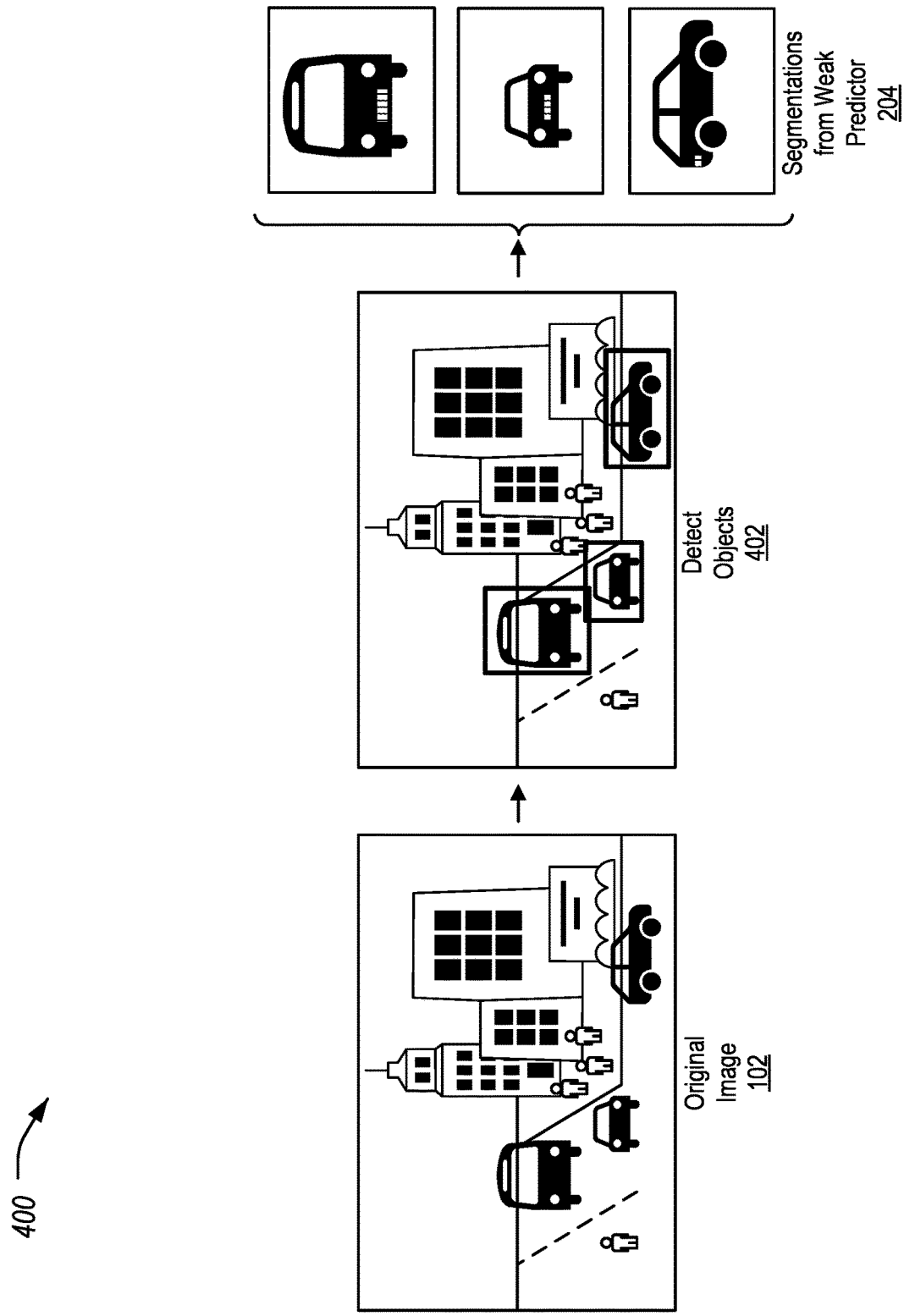
FIG. 4 illustrates an example of the obtaining of label proposals using the weak predictor approach.
Figure 5:
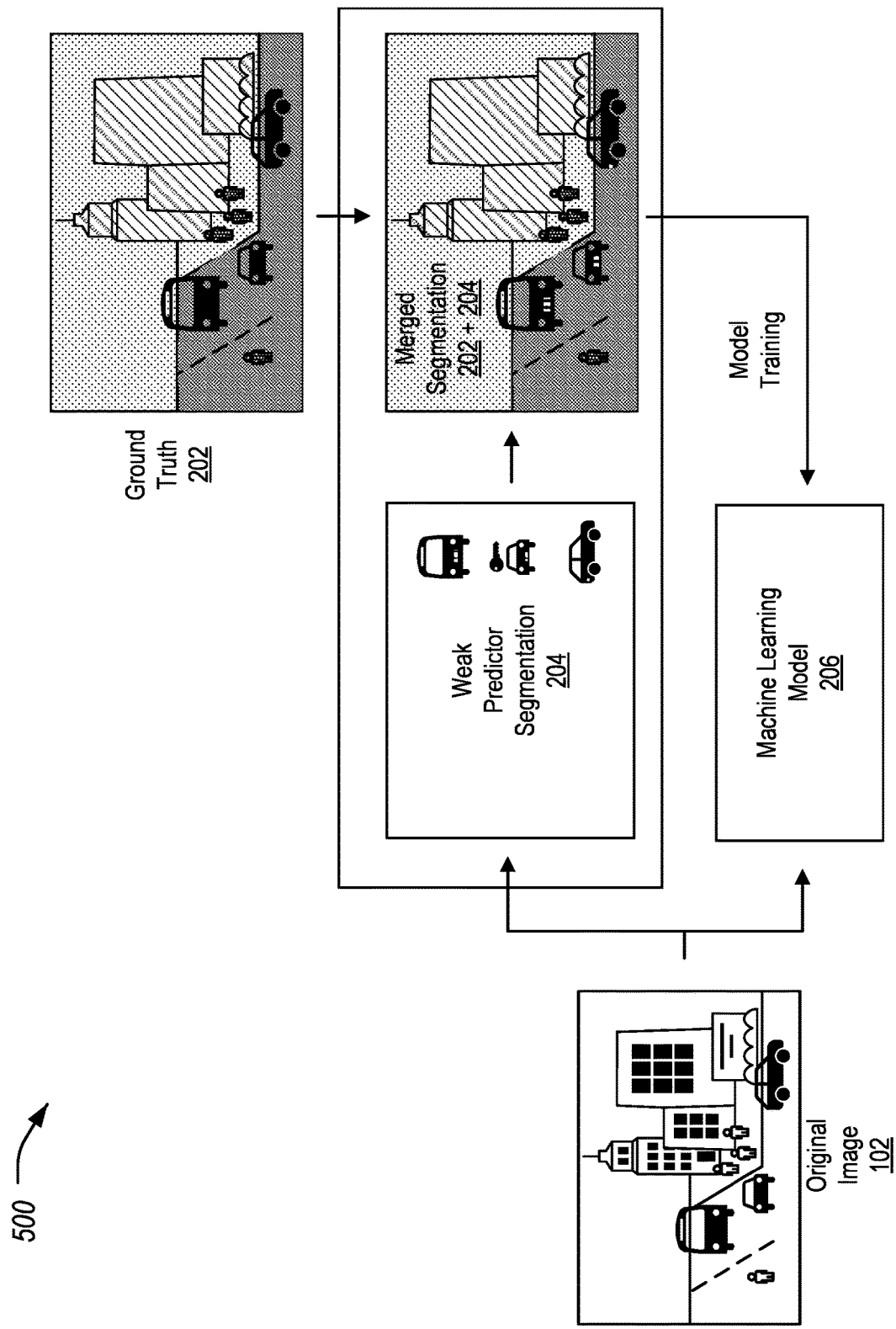
FIG. 5 illustrates an example of the learning approach using the label proposals from the weak predictors in combination with the ground truth.

FIGS. 4-5 illustrate an example of application of the process 300 to an original dataset 102. The original dataset 102 includes ground truth for classes of objects involving vehicles, persons, and roadways. However, the original dataset 102 lacks ground truth for license plates. In this example, the disclosed approach is used to allow for the training of the machine learning model 206 to recognize the additional license plate class. Weak predictors 104 are used to identify label proposals 106 for the license plates. These label proposals 106 may then be combined with the ground truth 202 from the original dataset 102 to perform the training of the machine learning model 206. While the example of FIGS. 4-5 relates to a vehicle-based example, it should be noted that the described techniques are not limited to such an environment and any other classes of objects for the semantic segmentation may be used. As an example, the environment may include classes of objects for detection of animals. As another example, the environment may include classes of objects where food items are to be detected. As yet another example, the environment may include classes of objects where intruders, customers, or other objects are to be detected from security cameras. As an even further example, the environment may include classes of objects for a factory or other manufacturing plant where defects or other properties of manufactured products are to be identified in factory video feeds.

FIG. 4 illustrates an example 400 of the obtaining of label proposals using the weak predictor 104 approach. As shown, an image from the original dataset 102 is illustrated on the left. The weak predictors 104 are used to add information with respect to a class of objects that is not included in the ground truth 202. More specifically, the weak predictors 104 in this example are trained for identifying license plates within likely vehicle object classes. As shown at 402 in the middle image, a set of bounding boxes for vehicles are identified by an object detector. Additionally, as shown on the right, label proposals 106 for the license plate class are identified by the weak predictors 104 for each of the identified objects. Thus, the weak predictors 104 may be used to generate a segmentation of the image from the original dataset 102 with respect to the license plate class.

FIG. 5 illustrates an example 500 of the learning approach using the label proposals 106 from the weak predictors 104 in combination with the ground truth 202. As shown at the left, the same image from the original dataset 102 is again used as an example. As shown at the top right, ground truth 202 labeling classes within the original dataset 102 is also shown. Significantly, the class of license plates is a novel class with respect to the ground truth 202. The label proposals 106 from the weak predictors 104 in the example 400 may be used to create a weak predictor segmentation ground truth 204. This weak predictor segmentation ground truth 204 may be combined with the ground truth 202 to create a merged segmentation. The ground truth 202 may then be used as an input for training the machine learning model 206 with the original dataset 102. Thus, the training of the machine learning model 206 may incorporate both the ground truth 202 from the original dataset 102 and also the label proposals 106 from the weak predictors 104 for the novel class.

Figure 6:
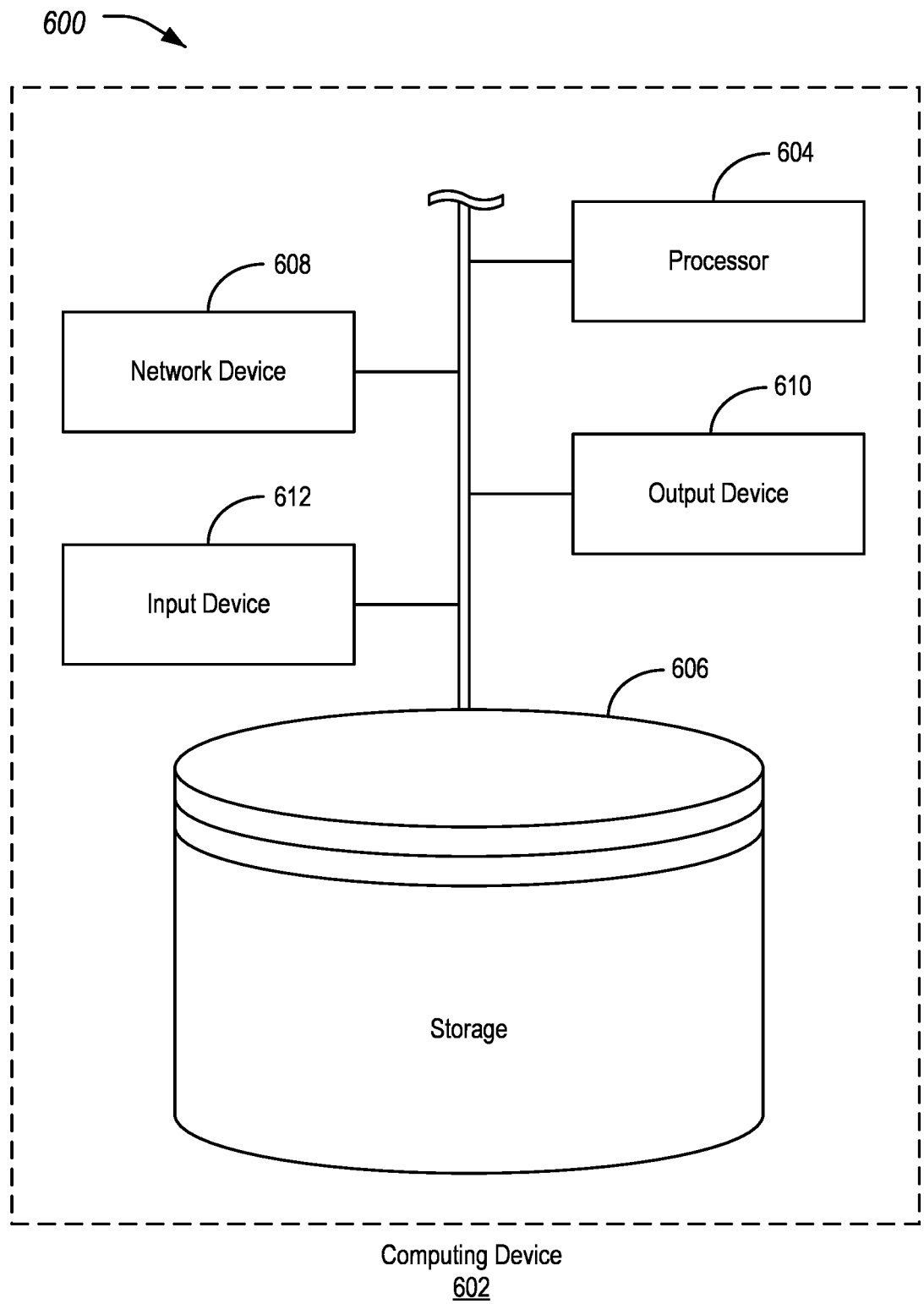
FIG. 6 illustrates an example system for performing the operations of FIGS. 1-5.

FIG. 6 illustrates an example 600 of a computing device 602 for use implementing the semantic segmentation in the absence of labels for one or more semantic classes using domain-knowledge distillation. Referring to FIG. 6, and with reference to FIGS. 1-5, the hardware performing the operations of the system 100 may be an example of such a computing device 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable computing device 602 to send and/or receive data from external devices over networks. Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for performing semantic segmentation in an absence of labels for one or more semantic classes, comprising:
    utilizing one or more weak predictors to obtain label proposals of novel classes for an original dataset for which at least a subset of sematic classes are unlabeled classes;
    merging the label proposals with ground truth of the original dataset to generate a merged dataset, the ground truth defining labeled classes of portions of the original dataset;
    training a machine learning model using the merged dataset; and
    utilizing the machine learning model for performing semantic segmentation on image data.

2. The method of claim 1, wherein the one or more weak predictors include a feature-based predictor configured to generate the label proposals by detecting edges within a region of interest in the original dataset.

3. The method of claim 1, wherein the one or more weak predictors include a transfer-based predictor configured to generate the label proposals by using a transfer model trained to predict classes of interest on a transfer information dataset separate from the original dataset.

4. The method of claim 1, wherein the merging of the label proposals includes
    assigning pixels of the original dataset to the unlabeled classes if so indicated by the label proposals; and
    assigning remaining pixels of the original dataset to the labeled classes specified by the ground truth of the original dataset.

5. The method of claim 1, wherein the training of the machine learning model utilizes a standard loss function that measures mismatch between predictions of the machine learning model and the ground truth.

6. The method of claim 1, wherein the training of the machine learning model utilizes a modified loss function that includes a standard loss function that measures mismatch between predictions of the machine learning model and the ground truth plus additional components that target losses specific to one or more of the novel classes.

7. The method of claim 1, wherein the semantic segmentation of the image data includes assigning of pixels of the image data to classes indicated in the ground truth as well as to the novel classes indicated in the label proposals.

8. A system for performing semantic segmentation in an absence of labels for one or more semantic classes, comprising:
one or more processors programmed to:
utilize one or more weak predictors to obtain label proposals of novel classes for an original dataset for which at least a subset of sematic classes are unlabeled classes;
merge the label proposals with ground truth of the original dataset to generate a merged dataset, the ground truth defining labeled classes of portions of the original dataset;
train a machine learning model using the merged dataset; and
utilize the machine learning model for performing semantic segmentation on image data.

9. The system of claim 8, wherein the one or more weak predictors include a feature-based predictor configured to generate the label proposals by detecting edges within a region of interest in the original dataset.

10. The system of claim 8, wherein the one or more weak predictors include a transfer-based predictor configured to generate the label proposals by using a transfer model trained to predict classes of interest on a transfer information dataset separate from the original dataset.

11. The system of claim 8, wherein to merge the label proposals includes to:
assign pixels of the original dataset to the unlabeled classes if so indicated by the label proposals; and
assign remaining pixels of the original dataset to the labeled classes specified by the ground truth of the original dataset.

12. The system of claim 8, wherein to train the machine learning model utilizes a standard loss function that measures mismatch between predictions of the machine learning model and the ground truth.

13. The system of claim 8, wherein to train the machine learning model utilizes a modified loss function that includes a standard loss function that measures mismatch between predictions of the machine learning model and the ground truth plus additional components that target losses specific to one or more of the novel classes.

14. The system of claim 8, wherein the semantic segmentation of the image data includes to assign of pixels of the image data to classes indicated in the ground truth as well as to the novel classes indicated in the label proposals.

15. A non-transitory computer-readable medium comprising instructions for performing semantic segmentation in an absence of labels for one or more semantic classes, that, when executed by one or more processors case the one or more processors to perform operations including to:
utilize one or more weak predictors to obtain label proposals of novel classes for an original dataset for which at least a subset of sematic classes are unlabeled classes;
merge the label proposals with ground truth of the original dataset to generate a merged dataset, the ground truth defining labeled classes of portions of the original dataset;
train a machine learning model using the merged dataset; and
utilize the machine learning model for performing semantic segmentation on image data.

16. The medium of claim 15, wherein the one or more weak predictors include a feature-based predictor configured to generate the label proposals by detecting edges within a region of interest in the original dataset.

17. The medium of claim 15, wherein the one or more weak predictors include a transfer-based predictor configured to generate the label proposals by using a transfer model trained to predict classes of interest on a transfer information dataset separate from the original dataset.

18. The medium of claim 15, wherein to merge the label proposals includes to:
assign pixels of the original dataset to the unlabeled classes if so indicated by the label proposals; and
assign remaining pixels of the original dataset to the labeled classes specified by the ground truth of the original dataset.

19. The medium of claim 15, wherein to train the machine learning model utilizes a standard loss function that measures mismatch between predictions of the machine learning model and the ground truth.

20. The medium of claim 15, wherein to train the machine learning model utilizes a modified loss function that includes a standard loss function that measures mismatch between predictions of the machine learning model and the ground truth plus additional components that target losses specific to one or more of the novel classes.

21. The medium of claim 15, wherein the semantic segmentation of the image data includes to assign of pixels of the image data to classes indicated in the ground truth as well as to the novel classes indicated in the label proposals.

* * * * *